United States Patent [19]
Ohkubo et al.

[11] Patent Number: 5,497,230
[45] Date of Patent: Mar. 5, 1996

[54] SPECTRORADIOMETER

[75] Inventors: Kazuaki Ohkubo, Takatsuki; Yasuo Nakagawa, Omiya, both of Japan

[73] Assignee: Matsushita Electric Industrial Co., Ltd., Osaka, Japan

[21] Appl. No.: 334,066

[22] Filed: Nov. 4, 1994

[30]   Foreign Application Priority Data

Nov. 4, 1993  [JP]  Japan ................. 5-274715

[51]  Int. Cl.$^6$ ............................. G01J 3/28
[52]  U.S. Cl. ......................... 356/328; 356/334
[58]  Field of Search ..................... 356/326, 328, 356/330–334, 307, 308

[56]   References Cited

U.S. PATENT DOCUMENTS

| | | |
|---|---|---|
| 3,886,331 | 5/1975 | Schierer. |
| 4,300,835 | 11/1981 | Schiemann et al. ............ 356/334 |
| 4,455,088 | 6/1984 | Koike ............................ 356/334 |
| 4,526,470 | 7/1985 | Kaye ............................ 359/319 |
| 4,540,282 | 9/1985 | Landa et al. ..................... 356/328 |
| 4,692,883 | 9/1987 | Nelson et al. .................... 364/571 |
| 4,717,254 | 1/1988 | Masuda .......................... 356/334 |
| 5,128,549 | 7/1992 | Kaye ........................ 356/328 X |

FOREIGN PATENT DOCUMENTS

| | | |
|---|---|---|
| 449442A1 | 10/1991 | European Pat. Off.. |
| 3343176A1 | 11/1983 | Germany. |
| 2-141630 | of 0000 | Japan. |
| 56-057925 | 5/1981 | Japan. |
| 61-201122 | 9/1986 | Japan. |

OTHER PUBLICATIONS

Sims et al, "Multielement Emission Spectroscopy Using a Charge–Injection Device Detector", American Chemical Society, 1983 pp. 117–131.

Primary Examiner—Vincent P. McGraw
Assistant Examiner—K. P. Hantis
Attorney, Agent, or Firm—Fish & Richardson

[57]    ABSTRACT

Light having a wavelength equal to or less than the cut-off wavelength of a sharp-cut filter is cut off so that an output of a photo-sensitive device corresponds to a stray light component when a wavelength control device sets the wavelength equal to or less than the cut-off wavelength of the sharp-cut filter. By subtracting the stray light component from the output of the photo-sensitive device when the photo-sensitive device is to be measured an intensity of light having a predetermined wavelength, the stray light component can be removed from dispersion outputs of the spectroradiometer.

10 Claims, 3 Drawing Sheets

F I G. 1
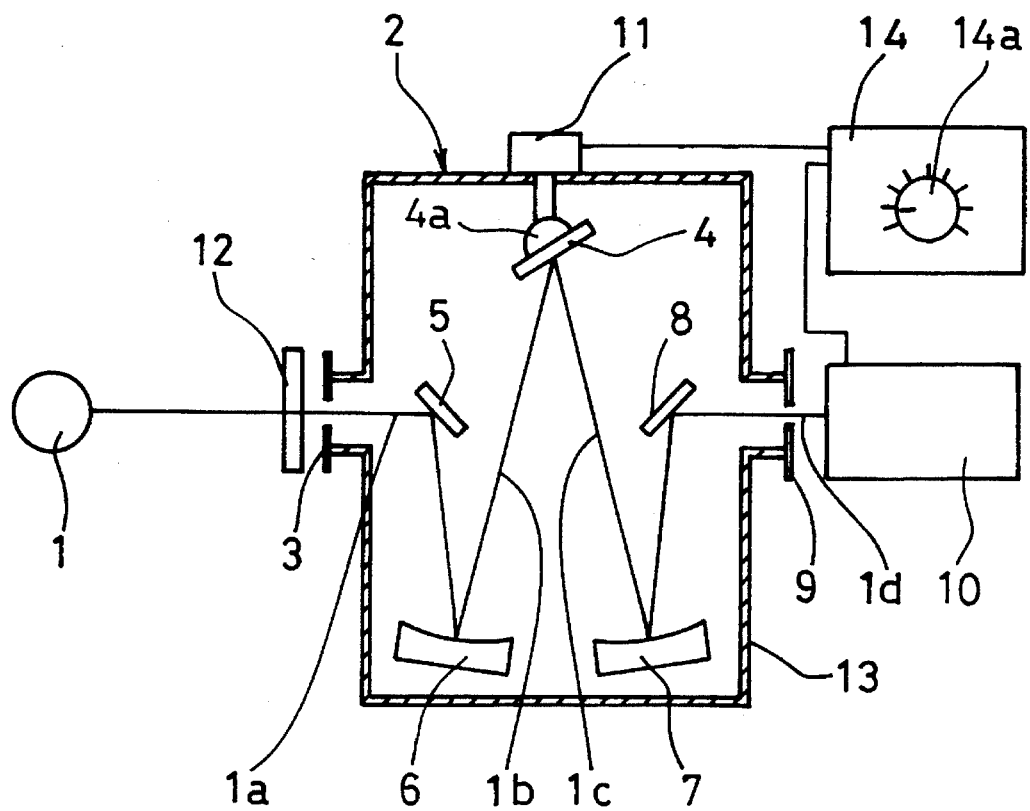

SPECTRORADIOMETER

FIELD OF THE INVENTION

This invention relates to a spectroradiometer used for measuring emission spectrum or spectral characteristics of an object to be measured.

DESCRIPTION OF THE PRIOR ART

In the conventional spectroscope, such as Czerny-Turner type diffraction grating spectroscope, used in a spectroradiometer, a dispersion element such as a diffraction grating is generally used in a dispersion optical system. In such an optical system, a light component, which enters the optical system through an entrance slit and deviates from the optical system or the diffraction grating, is scattered by inner walls or inner structures of the spectroscope and exits through an exit slit without being dispersed. Furthermore, another light component, which exits from the diffraction grating and is not dispersed as zero-th order diffracted light corresponding to an image of the entrance slit, illuminates the inside of the spectroscope. Reflected light from the illumination is scattered inside of the spectroscope and exits through the exit slit. Such light, which is called stray light of the spectroscope, is detected by a detection system disposed in the exit slit side of the spectroscope with dispersed components. Thus, it is necessary to remove the stray light component in spectrometric measurement.

To remove or reduce the stray light component, a double-spectroscope having a double dispersion system, a combination of a plurality of narrow-band filters, and a spectroscope, or a method for removing components except a component of a wavelength to be measured is generally used.

In a double-spectroscope having the double dispersion system, the dispersion effect of the entire spectroscope is reduced and the energy from monochromatic light, which is received by the detection system, becomes much smaller than that of the spectroscope having one dispersion system. Thus, a more sensitive and stable detection system is required. Furthermore, the configuration of the double-spectroscope is more complex, since it controls two dispersion systems.

SUMMARY OF THE INVENTION

This invention provides an improved high-sensitive spectroradiometer using a single dispersion system in which the stray light component is removed from outputs thereof, but the dispersion effect is not reduced.

A spectroradiometer of this invention comprises an entrance slit from which light to be measured enters into the spectroradiometer; an exit slit from which dispersed light having a predetermined wavelength exits; a sharp-cut filter disposed in front of the entrance slit for cutting off light having wavelength equal to or less than the cutoff wavelength of the sharp-cut filter; a collimator system for converting the light entering through the entrance slit into a parallel light beam; a dispersion system for dispersing the parallel light beam; a focusing system for focusing the light beam dispersed by the dispersion system on the exit slit; a photo-sensitive device provided at the rear of the exit slit for detecting light having a predetermined wavelength; a wavelength control device for controlling an incident angle of the parallel light beam from the collimator system to the dispersion system and an exit angle of the light beam from the dispersion system to the focusing system, thereby varying the wavelength of a light beam exiting through the exit slit; and a processor for subtracting a stray light component from an output of the photosensitive device. The stray light component is an output of the photo-sensitive device which is previously obtained by controlling the wavelength control device so that the wavelength of light beam exiting through the exit slit is equal to or less than the cut-off wavelength of the sharp-cut filter.

In the spectroradiometer configured above, it is preferable that the collimator system, the dispersion system, and the focusing system are integrated as a spectrometer. Furthermore, it is preferable that the dispersion system is a diffraction grating and that the wavelength controlling device rotates the diffraction grating around a rotation axis vertical to a plane where the collimator system, the dispersion system and the focusing system are provided. Furthermore, it is preferable that the photo-sensitive device is a photomultiplier.

By the above-mentioned configuration, light having a wavelength equal to or less than the cut-off wavelength of the sharp-cut filter cannot enter through the entrance slit. Thus, the output of the photo-sensitive device is essentially zero when the wavelength control device sets the wavelength equal to or less than the cut-off wavelength of the sharp-cut filter. If the output of the photo-sensitive device at the cut-off wavelength or below is not zero, it corresponds to the stray light component. Therefore, by subtracting the stray light component from the output of the photo-sensitive device when the processor controls the wavelength control device to measure a predetermined wavelength, the stray light component can be removed from dispersion outputs of the spectroradiometer.

In another configuration, a spectroradiometer of this invention comprises an entrance slit from which light to be measured enters into the spectroradiometer; a sharp-cut filter disposed in front of the entrance slit for cutting off light having wavelength equal to or less than the cut-off wavelength of the sharp-cut filter; a collimator system for converting the light entering through the entrance slit into a parallel light beam; a dispersion system for dispersing the parallel light beam; a focusing system for focusing the light beam dispersed by the dispersion system on a predetermined focal plane; a photo-sensor array provided on the focal plane so that a photo-sensor at an end of the photo-sensor array is positioned so that a light beam having a wavelength of cut-off wavelength equal to or below the sharp-cut filter is focused by the focusing system; a wavelength control device for controlling an incident angle of the parallel light beam from the collimator system to the dispersion system and an exit angle of the light beam from the dispersion system to the focusing system, thereby each of the light beams having different wavelengths being focused at different points; and a processor for subtracting a stray light component from output of each photo-sensor of the photo-sensor array. The stray light component is output from the photo-sensor at the end of the photo-sensor array positioned so that a light beam having a wavelength of cut-off wavelength equal to the sharp-cut filter is focused by the focusing system.

In the spectroradiometer configured above, it is preferable that the collimator system, the dispersion system, and the focusing system are integrated as a spectrometer. Furthermore, it is preferable that the dispersion system is a diffraction grating and that the wavelength controlling device rotates the diffraction grating around a rotation axis vertical to a plane where the collimator system, the dispersion system, and the focusing system are provided.

By the above-mentioned configuration, since the light having a wavelength equal to or less than the cut-off wavelength of the sharp-cut filter cannot enter through the entrance slit, the output of the photo-sensor at the end of the photo-sensor array when the wavelength control device sets the wavelength of the cut-off wavelength equal to or less than the sharp-cut filter corresponds to the stray light component. Therefore, by subtracting the stray light component from the outputs of other photo-sensors of the photo-sensor array corresponding to the other wavelengths to be measured, the stray light component can be removed from dispersion outputs of the spectroradiometer. Furthermore, a plurality of outputs of the photo-sensors corresponding to a plurality of wavelengths can be obtained at the same time so that the spectroradiometer can serve as multiple-channel spectroscope.

BRIEF DESCRIPTION OF THE DRAWINGS

FIG.1 is a sectional plan view showing a first embodiment of a spectroradiometer of this invention;

DETAILED DESCRIPTION OF THE INVENTION

Figure 2:
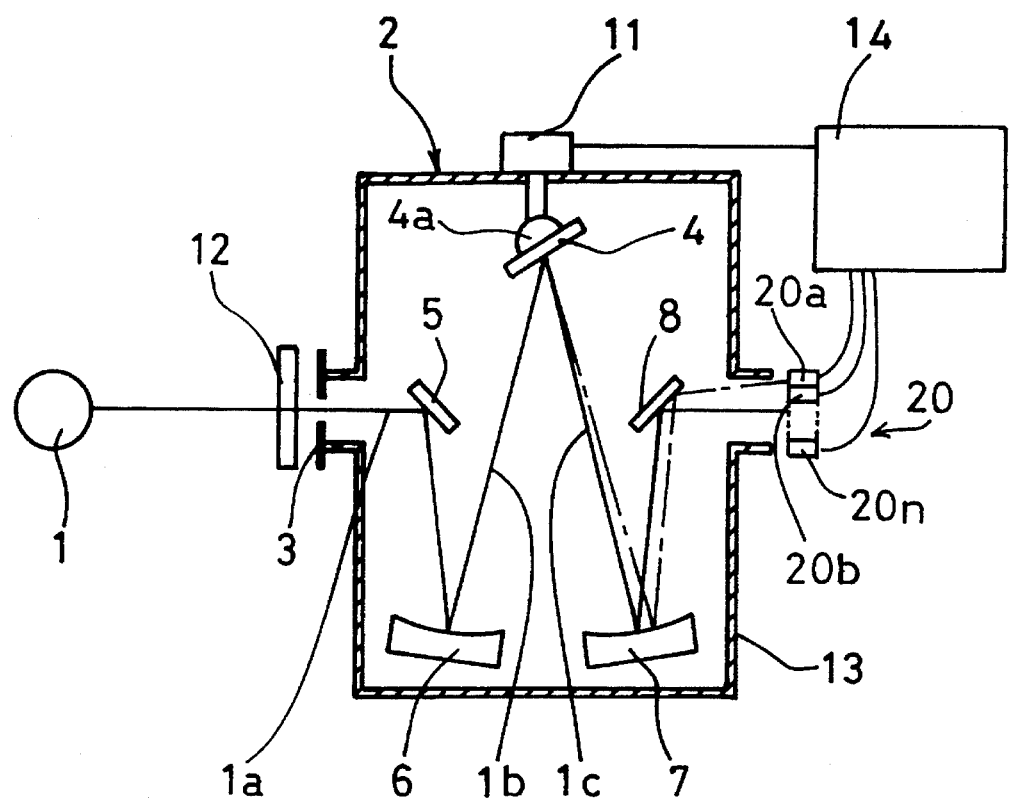
FIG.2 is a sectional plan view showing a second embodiment of a spectroradiometer of this invention.

The invention will be described with reference to FIGS. 1 and 2. A first embodiment of a spectroradiometer of the invention will be described with reference to FIG. 1.

As shown in FIG. 1, the spectroradiometer of the first embodiment comprises a Czerny-Turner type diffraction grating spectroscope 2, a sharp-cut filter 12, a photomultiplier 10, and a processor 14. The spectroscope 2 is comprised of a housing 13 with an entrance slit 3, and an exit slit 9, first and second plane mirrors 5, 8, a collimator mirror 6, a focusing mirror 7, a diffraction grating 4, and a wavelength controller 11. The sharp-cut filter 12 is disposed in front of the entrance slit 3 and faces an object 1 to be measured. A light beam from object 1 enters the spectroscope 2 through entrance slit 3 and sharp-cut filter 12. The diffraction grating 4 rotates around its rotation axis 4a which is perpendicular to a plane where the above-mentioned optical system is provided.

The pitch of diffraction grating 4 is 1200 /mm and the blaze wavelength is 250 nm. The focal length of collimator mirror 6 is 250 mm, and the focal length of focusing mirror 7 is 250 mm.

Light beam 1a from object 1 passes through entrance slit 3 and is reflected to collimator mirror 6 by the plane mirror 5. Entrance slit 3 is positioned at a focus of collimator mirror 6. Thus, light beam 1a passing through entrance slit 3 is expanded to a parallel light beam 1b by collimator mirror 6. Light beam 1b illuminates diffraction grating 4. Diffraction grating 4 diffracts light beam 1b corresponding to the wavelength of light contained in light beam 1b. Thus, light beam 1b is dispersed. Dispersed light beam 1c is focused on exit slit 9 by focusing mirror 7 and plane mirror 8 as an image of entrance slit 3. Intensity of light 1d having a predetermined wavelength and exiting through exit slit 9 is detected by photomultiplier 10 which is disposed at the rear of exit slit 9 of spectroscope 2.

The wavelength of dispersed light, which exits from exit slit 9, is changeable. When adjuster 14a of processor 14 of spectroscope 2 is controlled, diffraction grating 4 is rotated by wavelength controller 11 in response to indication of a scale of the processor 14. Thus, an incident angle of incident light beam 1b into diffraction grating 4 from collimator mirror 6 and an exit angle of diffracted light beam 1c to focusing mirror 7 from diffraction grating 4 are varied. Diffraction angle of the light diffracted by diffraction grating 4 responds to the wavelength of the light. As a result, the wavelength of the light which exits through the exit slit 9 can be changed.

Since sharp-cut filter 12 has a cut-off wavelength of 250 nm or below is disposed in front of entrance slit 3 of spectroscope 2, light beam 1a from object 1 to be measured is introduced into housing 13 of spectroscope 2 through sharp-cut filter 12. Thus, a light component having, for example, a wavelength of 200 nm is cut-off by sharp-cut filter 12 and not included in light beam 1a. When adjuster 14a of processor 14 is adjusted to indicate that a wavelength of 200 nm to be measured, the output of photomultiplier 10 should essentially be zero.

However, a part of light beam 1a is not reflected by plane mirror 5 or collimator mirror 6. Stray light does not reach diffraction grating 4 and the stray light is reflected by inner walls and/or inner structures of spectroscope 2. Furthermore, a part of the stray light in the spectroscope 2 exits from exit slit 9 and enters into photomultiplier 10. Similarly, a part of parallel light beam 1b which is reflected by collimator mirror 6 and does not reach the diffraction grating 4 and a zero-th order diffracted light from diffraction grating 4 are not dispersed but reflected by the inner walls and/or inner structures of spectroscope 2. Stray light can also exit through exit slit 9 and enter into photomultiplier 10.

The above-mentioned stray light components are not dispersed so that the amount of the light exiting through exit slit 9 is constant with no relation to the indication of the scale of processor 14, even when the amount of the light entering into spectroscope 2 does not change.

Previously, adjuster 14a of processor 14 is adjusted to indicate the wavelength, for example, 200 nm which is shorter than the cut-off wavelength, for example 250 nm of sharp-cut filter 12. The output of photomultiplier 10 is due to the stray light components only, since the dispersed light component of a wavelength of 200 nm is zero. The output of photomultiplier 10 obtained by this operation is memorized in processor 14 as a stray light component.

Adjuster 14a of processor 14 is adjusted to indicate an optional wavelength and the output of photomultiplier 10 is obtained. The output of the stray light component of photomultiplier 10 which is previously obtained is subtracted from the output of photomultiplier 10 due to the dispersed light and stray light component by processor 14. As a result, the stray light component can be subtracted from the measured value of the optional wavelength.

Figure 3:
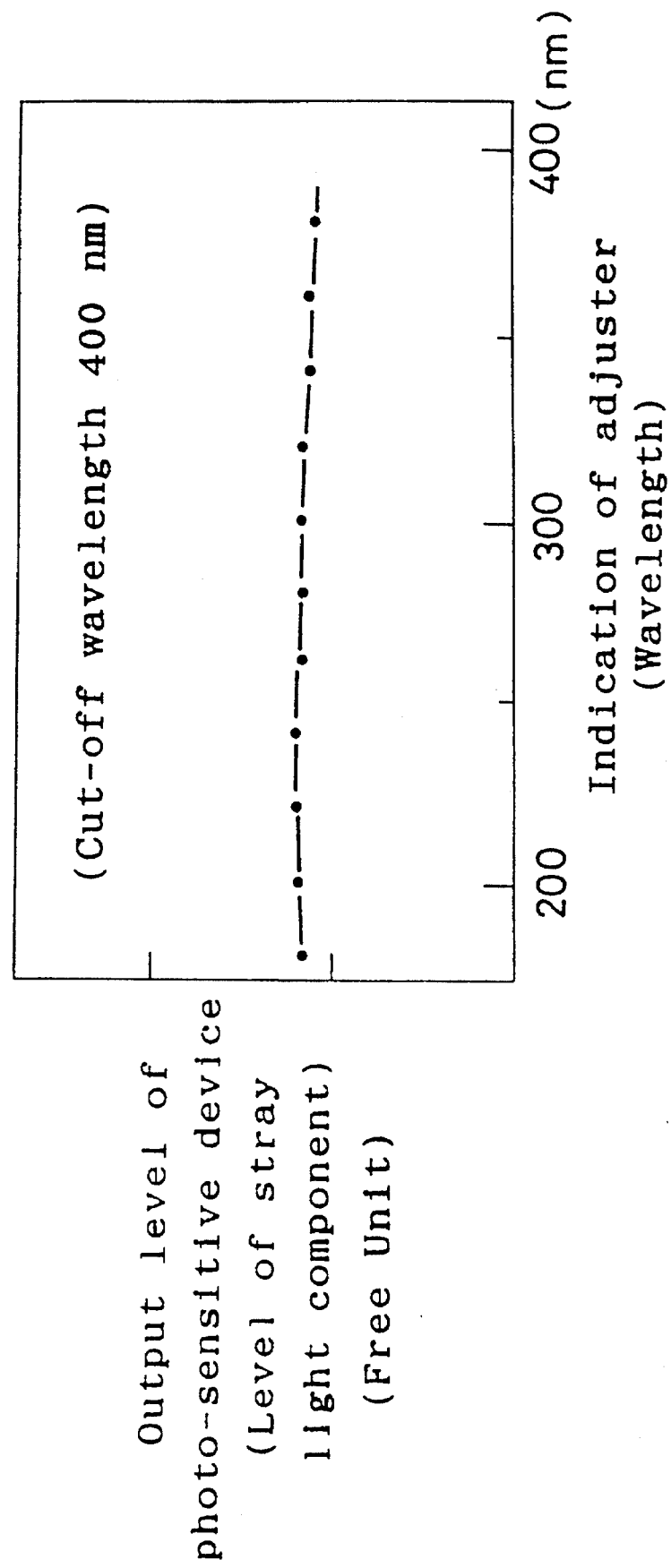
FIG.3 shows the relation between the output level of photo-sensitive device and the indication of adjuster when the indication of the wavelength is less than the wavelength of the cut-off wavelength of the sharp-cut filter.

Hereupon, a sharp-cut filter having a cut-off wavelength of 400 nm was used, and the spectrum of a halogen lamp was measured by the spectroradiometer shown in FIG. 1. The result of measurement is shown in FIG. 3. As shown in FIG. 3, the output level of the photo-sensitive device (photomultiplier 10) was substantially constant, even when the indication of adjuster 14a was changed from 180 nm to 380 nm. Since the light having a wavelength equal to or less than the cut-off wavelength 400 nm of sharp-cut filter 12 cannot enter through the entrance slit 3, the output of the photo-sensitive device is essentially zero. Therefore, the output of the photo-sensitive device at the cut-off wavelength or below corresponds to the stray light component. It was found that the stray light component was constant. Therefore, by subtracting the stray light component from the output of the photo-sensitive device, the stray light component can be removed from dispersion outputs of the spectroradiometer.

A second embodiment of a spectroradiometer of the invention will be described with reference to FIG. 2. The second embodiment relates to a multiple-channel spectroradiometer which measures spatially dispersed light beams by plural photo-sensors at the same time. As shown in FIG. 2, the spectroradiometer of the second embodiment comprises a Czerny-Turner type diffraction grating spectroscope 2, a sharp-cut filter 12, a photo-sensor array 20, and a processor 14. The spectroscope 2 is comprised of a housing 13 with an entrance slit 3, an exit slit 9, first and second plane mirrors 5, 8, a collimator mirror 6, a focusing mirror 7, a diffraction grating 4, and a wavelength controller 11. The diffraction grating 4 rotates around its rotation axis 4a.

In comparison with the first embodiment, the photo-sensor array 20 is disposed at the exit end of housing 13 of spectroscope 2, which is used instead of the exit slit 9 and the photomultiplier 10 in the first embodiment. The optical system of the spectroscope 2 in the second embodiment is substantially the same as that in the first embodiment, so that the explanation of the light path in the optical system is omitted.

A photo-sensor 20a at an end of photo-sensor array 20 is disposed so that a dispersed light beam having a wavelength $\lambda_o$ of, for example, 250 nm which is the cut-off wavelength of sharp-cut filter 12 in the first embodiment. An output of photo-sensor 20a is memorized in a memory of processor 14 as a stray light component generated in the optical system of spectroscope 2. The stray light component is subtracted from outputs of other photo-sensors 20b to 20n of photo-sensor array 20 by processor 14. Each of photo-sensor 20b to 20n corresponds to a predetermined wavelength to be measured. Thereby, spectroscopic outputs not containing the stray light component can be obtained.

As mentioned above, since the spectroradiometer of this invention uses single dispersion system such as Czerny-Turner type diffraction grating spectroscope, dispersion effects of the spectroradiometer are not reduced, and the configuration is not complex. Furthermore, since the stray light component is subtracted from the outputs of photomultiplier 10 or photo-sensors 20b to 20n of photo-sensor array 20 by processor 14, the sensitivity of the spectroradiometer is increased.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A spectroradiometer comprising:

an entrance slit from which to be measured enters into said spectroradiometer;

an exist slit from which dispersed light having a predetermined wavelength exits;

a sharp-cut filter disposed in front of said entrance slit for cutting off light having a wavelength equal to or less than the cut-off wavelength of said sharp-cut filter;

a collimator system for converting said light entering through said entrance slit to a parallel light beam;

a dispersion system for dispersing said parallel light beam;

a focusing system for focusing a portion of said parallel light beam dispersed by said dispersion system having a predetermined wavelength on said exit slit;

a photo-sensitive device disposed at the rear of said exit slit for detecting light exiting through said exit slit;

a wavelength control device for controlling an incident angle of said parallel light beam from said collimator system to said dispersion system and an exit angle of said light beam from said dispersion system to said focusing system, thereby varying a wavelength of the portion of the parallel light beam focused on said exit slit; and a processor for subtracting a stray light component from an output of said photo-sensitive device, said stray light component being an output of said photo-sensitive device which is previously obtained by controlling said wavelength control device so that said wavelength of the portion of the parallel light beam focused on said exit slit is equal to or less than said cut-off wavelength of said sharp-cut filter.

2. The spectroradiometer in accordance with claim 1, wherein said collimator system, said dispersion system, and said focusing system are integrated as a spectrometer.

3. The spectroradiometer in accordance with claim 1, wherein said dispersion system is a diffraction grating; and said wavelength controlling device rotates said diffraction grating around a rotation axis vertical to a plane where said collimator system, said dispersion system, and said focusing system are provided.

4. The spectroradiometer in accordance with claim 1, wherein said photo-sensitive device is a photomultiplier.

5. The spectroradiometer in accordance with claim 2, wherein said collimator system, said dispersion system, and said focusing system are integrated as a spectrometer.

6. The spectroradiometer in accordance with claim 2, wherein said photo-sensitive device is a photomultiplier.

7. A spectroradiometer comprising:

an entrance slit firm which light to be measured enters said spectroradiometer;

a sharp-cut filter disposed in front of said entrance slit for cutting off light having a wavelength equal to or less than the cut-off wavelength of said sharp-cut filter;

a collimator system for converting said light entered from said entrance slit to a parallel light beam;

a dispersion system for dispersing said parallel light beam;

a focusing system for focusing said light beam dispersed by the dispersion system on a predetermined focal plane;

a photo-sensor array for detecting light focused thereon by said focusing system, comprising a plurality of photo-sensors provided and positioned on said focal plane such that a noise photo-sensor at an end of said photo-sensor array is positioned at a point where a light beam having a wavelength equal to said cut-off wavelength of said sharp-cut filter would be focused by said focusing system if not cut off by said sharp-cut filter;

a wavelength control device for controlling an incident angle of said parallel light beam from said collimator system to said dispersion system and an exit angle of said light beam from said dispersion system to said focusing system, thereby each of said light beams having different wavelengths being focused at different points; and a processor for subtracting a stray light component from an output of each of said photo-sensors of said photo-sensor array, said stray light component being an output of said noise photo-sensor.

8. The spectroradiometer in accordance with claim 7, wherein said collimator system, said dispersion system, and said focusing system are integrated as a spectrometer.

9. The spectroradiometer in accordance with claim 7, wherein said dispersion system is a diffraction grating; and said wavelength controlling device rotates said diffraction grating around a rotation axis vertical to a plane where said collimator system, said dispersion system, and said focusing system are provided.

10. The spectroradiometer in accordance with claim 8, wherein said dispersion system is a diffraction grating; and said wavelength controlling device rotates said diffraction grating around a rotation axis vertical to a plane where said collimator system, said dispersion system, and said focusing system are provided.

* * * * *